United States Patent
D'Penha et al.

(10) Patent No.: US 9,374,465 B1
(45) Date of Patent: Jun. 21, 2016

(54) MULTI-CHANNEL AND MULTI-MODAL LANGUAGE INTERPRETATION SYSTEM UTILIZING A GATED OR NON-GATED CONFIGURATION

(71) Applicant: Language Line Services, Inc., Monterey, CA (US)

(72) Inventors: Lindsay D'Penha, Carmel, CA (US); Scott Swanson, Salinas, CA (US); Angus Walker, Woodinville, WA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 14/620,172

(22) Filed: Feb. 11, 2015

(51) Int. Cl.
*H04M 1/00* (2006.01)
*H04M 3/51* (2006.01)
*H04W 4/22* (2009.01)
*H04M 3/523* (2006.01)

(52) U.S. Cl.
CPC .......... *H04M 3/5116* (2013.01); *H04M 3/5183* (2013.01); *H04M 3/5233* (2013.01); *H04W 4/22* (2013.01)

(58) Field of Classification Search
None
See application file for complete search history.

(56) References Cited

U.S. PATENT DOCUMENTS

| | | | | |
|---|---|---|---|---|
| 6,690,932 | B1 * | 2/2004 | Barnier | H04M 3/5233 379/45 |
| 2002/0135618 | A1 * | 9/2002 | Maes | G06F 3/0481 715/767 |
| 2003/0069997 | A1 * | 4/2003 | Bravin | G06F 17/2765 709/250 |
| 2005/0130666 | A1 * | 6/2005 | Levy | H04W 8/24 455/452.2 |
| 2005/0261890 | A1 * | 11/2005 | Robinson | G06F 17/289 704/9 |
| 2008/0300856 | A1 * | 12/2008 | Kirk | B07C 3/00 704/4 |
| 2010/0112530 | A1 * | 5/2010 | Schoenbach | G06F 17/30017 434/116 |
| 2010/0150331 | A1 * | 6/2010 | Gitelis | H04M 3/56 379/202.01 |
| 2010/0261448 | A1 * | 10/2010 | Peters | H04W 76/007 455/404.1 |
| 2015/0022636 | A1 * | 1/2015 | Savransky | H04R 3/00 348/46 |

* cited by examiner

*Primary Examiner* — Maria El-Zoobi
(74) *Attorney, Agent, or Firm* — Patent Ingenuity, P.C.; Samuel K. Simpson

(57) ABSTRACT

A system, computer program product, and process are provided for multi-channel language interpretation. An interpreter voice communication device receives, from a PSAP communication device on a first channel, a request for language translation of a communication. The interpreter voice communication device also receives data through the first channel that assists a language interpreter in performing the translation. An interpreter computing device establishes a language interpretation session through a second channel with a PSAP workstation. The interpreter computing device also provides a real-time language translation of the communication based upon the data received through the first channel.

20 Claims, 16 Drawing Sheets

MULTI-CHANNEL AND MULTI-MODAL LANGUAGE INTERPRETATION SYSTEM UTILIZING A GATED OR NON-GATED CONFIGURATION

BACKGROUND

1. Field

This disclosure generally relates to the field of language interpretation. More particularly, the disclosure relates to multi-channel language interpretation.

2. General Background

Many current emergency response systems provide users with the ability to request emergency response services such as police, medical, and firefighting services in the event of an emergency via voice based communication technology. For instance, a user in an emergency situation typically utilizes a telephone to place a call to a public safety access point ("PSAP") to request such services. The PSAP is a call center that receives the telephone call from the user, routes the telephone call to a PSAP call taker that speaks with the caller to determine the necessary emergency services in addition to other information pertinent to the particular location and emergency, and dispatches the corresponding emergency services to the caller. As an example, the caller can place a telephone call to a predefined telephone number such as 911 to speak with a call taker at a PSAP such as a 911 call center.

Such current emergency response systems may only provide voice communications based upon a particular language. For example, the PSAP call taker may only speak English. The caller in the emergency situation would then have to speak English to communicate with the PSAP call taker in such configurations. As a result, a person that has Limited English Proficiency ("LEP") would not be able to communicate effectively with a PSAP call taker. Therefore, the LEP may or may not receive the necessary emergency services in time to stop the emergency situation.

Further, voice based emergency response systems are limited in their applicability. For instance, a user that may be capable of providing a voice based communication may not be able to provide such a communication in the particular emergency situation. As an example, a user in a hostage situation is prevented from providing a voice based communication. Thus, such a user with access to a mobile device may not be able to request emergency services. In addition, a user that has a voice disability is prevented from providing a voice based communication.

Therefore, current voice based emergency response systems are not adequate for providing communication for those users speaking a different language or those users for which voice based communication is not feasible based upon the particular context of the emergency situation or a particular disability. Such deficiencies in current voice based emergency response systems may prevent effective dispatching of emergency services in emergency situations.

SUMMARY

A system, computer program product, and process are provided for multi-channel language interpretation. An interpreter voice communication device receives, from a PSAP communication device on a first channel, a request for language translation of a communication. The interpreter voice communication device also receives data through the first channel that assists a language interpreter in performing the translation. An interpreter computing device establishes a language interpretation session through a second channel with a PSAP workstation. The interpreter computing device also provides a real-time language translation of the communication based upon the data received through the first channel.

The multi-channel language interpretation configurations are not limited to two channels as a plurality of channels having more than two channels may be utilized. Further, the multi-channel language interpretation configurations may be multi-modal as a variety of modes may be utilized to provide and receive communications such as text, voice, video, image, streaming, etc.

Further, the multi-channel language interpretation configurations may be gated or non-gated. A PSAP communication taker determines if the real-time language translation is sent to the communication provider, e.g., the LEP, based upon a gated configuration according to the discretion of the PSAP communication taker. Alternatively, the real-time language translation is provided directly to the communication provider based upon a non-gated configuration without the PSAP having discretion as to whether or not the translation is sent to the communication provider.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A multi-channel and multi-modal language interpretation system is provided so that language interpretation can be communicated effectively in situations such as non-verbal needs emergency situations. A communication taker can respond and dispatch pertinent services based upon an understanding of the situation described by the LEP and interpreted for the communication taker. A variety of modes, e.g., strings of text, images, videos, etc., may be utilized by the LEP to communicate with the communication taker.

Figure 1A:
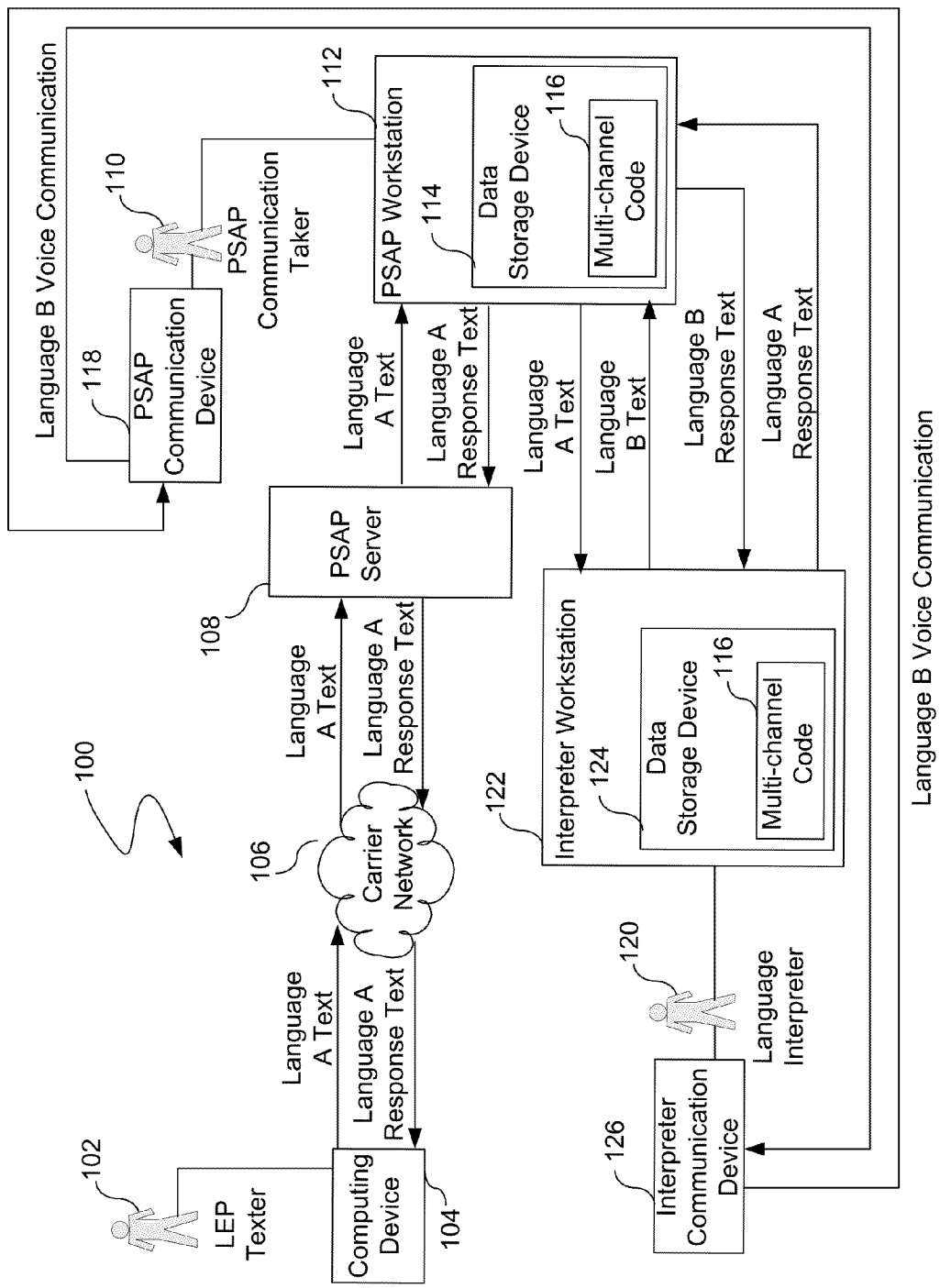
FIG. 1A illustrates a multi-channel and text mode language interpretation system that utilizes a gated configuration.

FIG. 1A illustrates a multi-channel and text mode language interpretation system 100 that utilizes a gated configuration. The text mode is utilized for illustrative purposes, but any other type of mode, e.g., image, video, etc., may be utilized with the illustrated implementation. Further, the term text mode refers to a communication mode that sends and receives strings of text, e.g., SMS, chat, etc. A communication provider is the person requesting emergency services through a mode of communication. As the text mode is illustrated in FIG. 1A, the communication provider is referred to as an LEP texter 102.

The LEP texter 102 is an LEP that sends a string of text in a language other than English, e.g., Spanish, and requests a particular service. For instance, the LEP texter 102 may send a string of text in Spanish to an emergency call center, e.g., a 911 call center, in an emergency situation where a voice communication is not readily available. The LEP texter 102 sends the string of text in language A, e.g., Spanish, from a computing device 104. The computing device 104 may be a smartphone, tablet device, personal computer, laptop computer, etc.

The string of text is sent through a carrier network 106, e.g., a cellular network utilized by the computing device 104. The carrier network 106 routes the string of text to a corresponding PSAP server 108, e.g., a server for a 911 call center. The PSAP server 108 then routes the string of text to an available PSAP communication taker 110. The PSAP communication taker 110 reviews the received communication, e.g., the string of text in language A, and determines that the string of text is not in English. The PSAP communication taker 110 can then request a language interpretation session. If language A, e.g., Spanish, cannot easily be identified by the PSAP communication taker 110, a computer application service, e.g., a web service, may be called to identify the particular language for the PSAP communication taker 110.

The PSAP workstation 112 has a data storage device 114 that stores multi-channel code 116. The multi-channel code 116 is utilized by a processor of the PSAP workstation 112 to manage the multi-channel communication flow during the language interpretation session. A language interpretation session is initiated via the processor according to two channels, i.e., a text channel and a voice channel. A unique session identifier identifies the particular language interpretation session. The particular string of text initially sent by the LEP texter 102 is forwarded from the PSAP workstation 112 to a language interpreter 120 through an interpreter workstation 122. The interpreter workstation 122 has a data storage device 124 that also stores the multi-channel code 116. In one embodiment, the multi-channel code 116 is provided to the PSAP workstation 112 and the interpreter workstation 122 through an Application Programming Interface ("API"). The PSAP communication taker 110 also communicates via a voice channel with the language interpreter 120 from a PSAP communication device 118 to an interpreter communication device 126. The PSAP communication device 118 and the interpreter communication device 126 may be telephones, smartphones, or other devices capable of performing voice communications. During the voice communication, the PSAP communication taker 110 provides the unique session identifier to the language interpreter 120, a computer system, or an interactive voice response ("IVR") systems so that the language interpreter 120 is able to view the same user interface that is viewed by the PSAP communication taker 110.

The language interpreter 120 utilizes the initial forwarded text in language A from the LEP texter 104 and additional information provided by the PSAP communication taker 110 in language B, e.g., English, concerning the particular situation to provide an effective language interpretation. For instance, the PSAP communication taker 110 may have additional information concerning the particular LEP texter 104 that was not provided in the string of text in Language A, e.g., location data determined from GPS coordinates, data previously provided by the LEP texter 104 to a PSAP call center, additional information received from other peoples that have also communicated with the PSAP call center about the same situation, etc. The language interpreter 120 then performs a language interpretation of the string of text in language A to language B. The language interpreter 120 then sends the translated text in language B to the PSAP communication taker 110 through the PSAP workstation 112.

For example, the initial string of text in language A, e.g., Spanish, may have been "Hay un fuego." The PSAP communication taker 110 may have recognized that the string of text was not in English and determined independently or with utilization of a language identification service that language A is Spanish. The PSAP communication taker 110 initiates a language interpretation session with available language interpreter 120. The PSAP workstation 112 sends the initial string of text in Spanish to the language interpreter 120 and manages a voice communication between the PSAP communication taker 110 and the language interpreter 120. The PSAP communication taker 110 then provides any additional information that may be helpful to the language interpreter 120 to perform a translation of the initial string of text. The language interpreter 120 then translates the initial string of text to a string of text in language B, e.g., English. Therefore, the language interpreter 120 translates the string of text to "There is a fire." The translated text is then sent to the PSAP workstation 112 for viewing by the PSAP communication taker 110. The translated text may only be sent to the PSAP communication taker 110 as providing the translated text to the LEP texter 102 in a language that is not understandable to the LEP texter 102 in an emergency situation may only further complicate the situation.

In an alternative embodiment, the language interpreter 120 may provide the translation of the initial string of text to the PSAP communication taker 110 through the voice communication rather than through a translated string of text so that the language interpreter 120 does not have to type the translated string of text to possibly expedite the interpretation process. In another embodiment, the language interpreter 120 provides the translation of the initial string of text to the PSAP communication taker 110 through voice and text.

After the PSAP communication taker 110 understands the initial string of text, the PSAP communication taker 110 formulates a response in a string of text in language B, e.g., English, and sends that formulated response to the language interpreter 120 through the interpreter workstation 122. The language interpreter 120 then sends the string of text translated into language A, e.g., Spanish, to the PSAP communication taker 110. This configuration is a gated configuration since the PSAP communication 110 determines if the translated text should be sent to the LEP texter 102. If the PSAP communication taker 110 determines that the translated response text should be sent to the LEP texter 102, the PSAP workstation 112 sends the translated response text to the PSAP server 108. The PSAP server 108 then sends the translated response text to the LEP texter 102.

Utilizing the previous example, the PSAP communication taker 110 may want to formulate the following string of text in response to the initial string of text of the LEP texter 102: "What is your address?" The PSAP communication taker 110 sends the response text in language B, e.g., English, to the language interpreter 120. The language interpreter 120 then translates the response text to language A, e.g., Spanish, as follows: "Cual es su direccion?" The interpreter workstation 122 then sends the response text to the PSAP workstation 112 so that the PSAP communication taker 110 can have the discretion of whether or not to send the translated response text in a particular instance to the LEP texter 104 according to the gated configuration. For instance, the PSAP communication taker 110 may have received external information concerning the situation that leads the PSAP communication taker 110 to believe that sending a text message to the LEP texter 102 may draw too much attention to the LEP texter 102 in a hostage situation. The PSAP communication taker 110 may then wait to send the translated response.

In an alternative embodiment, the language interpreter 120 may translate the formulated response as a voice communication rather than as a text message. In another embodiment, the language interpreter 120 may utilize both a voice communication and a text message to send the formulated response to the language interpreter 110.

The PSAP communication taker 110 and the language interpreter 120 may then perform further iterations of text translation and text response formulation so that the PSAP communication taker 110 can obtain enough information to dispatch corresponding services to the LEP texter 102. Although only two channels are illustrated, e.g., text and voice, more than two channels having additional types of communication may be utilized to perform language interpretation and response formulation.

Figure 1B:
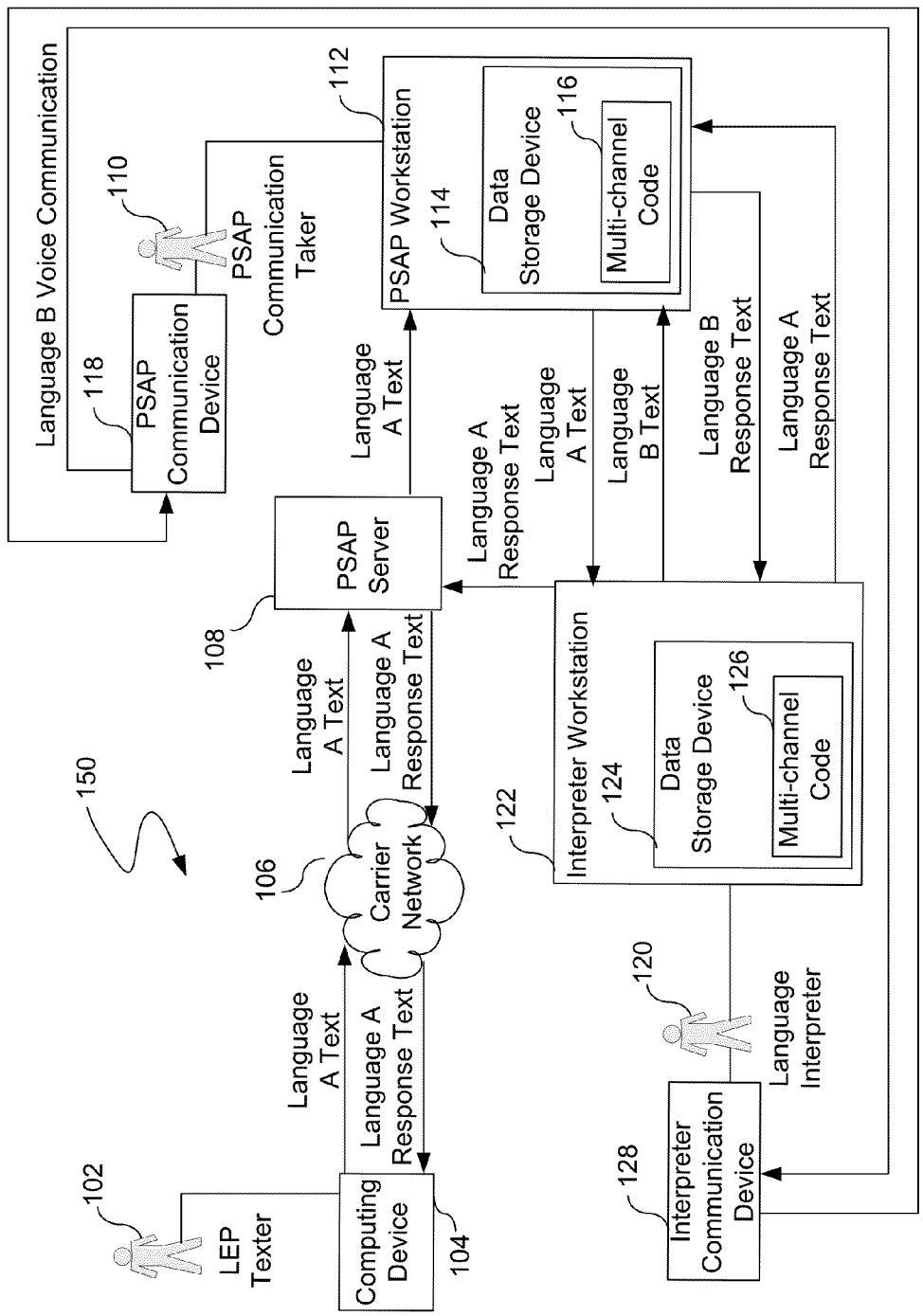
FIG. 1B illustrates a multi-channel and text mode language interpretation system that utilizes a non-gated configuration.

FIG. 1B illustrates a multi-channel and text mode language interpretation system 150 that utilizes a non-gated configuration. The non-gated configuration automatically sends translated formulated responses from the interpreter workstation 122 to the PSAP server 108 for transmission to the LEP texter 102 without providing the PSAP communication taker 110 with the discretion of deciding whether or not to send the translated formulated response to the LEP texter 102. The PSAP communication taker 110 may or may not receive a copy of the translated formulated response. For instance, the non-gated configuration is helpful in sending formulated responses to the LEP texter 102 in emergency situations where delay has to be avoided and the LEP texter 102 is able to view the translated formulated response.

The embodiments described in FIGS. 1A and 1B are not limited to language interpretation of a spoken language. For example, sign language can be interpreted through modes such as image and/or video.

Figure 2A:
FIG. 2A illustrates a computing device graphical user interface ("GUI") displayed by the computing device.

FIGS. 2A-2K illustrate a plurality of screen shots of user interfaces that are displayed by the computing device 104, the PSAP workstation 112, and the interpreter workstation 122 illustrated in FIGS. 1A and 1B. FIG. 2A illustrates a computing device GUI 200 displayed by the computing device 104. As an example, the computing device 104 is illustrated as a smartphone. The computing device GUI 200 allows the LEP 102 to send and receive text messages, e.g., SMS text messages.

The LEP 102 may utilize the computing device 104 to send a text message 202 such as "Hay un fuego" to a PSAP facility, e.g., a 911 call and/or text center. The text message 202 that is sent to the PSAP facility is displayed on the computing device GUI 200.

Figure 2B:
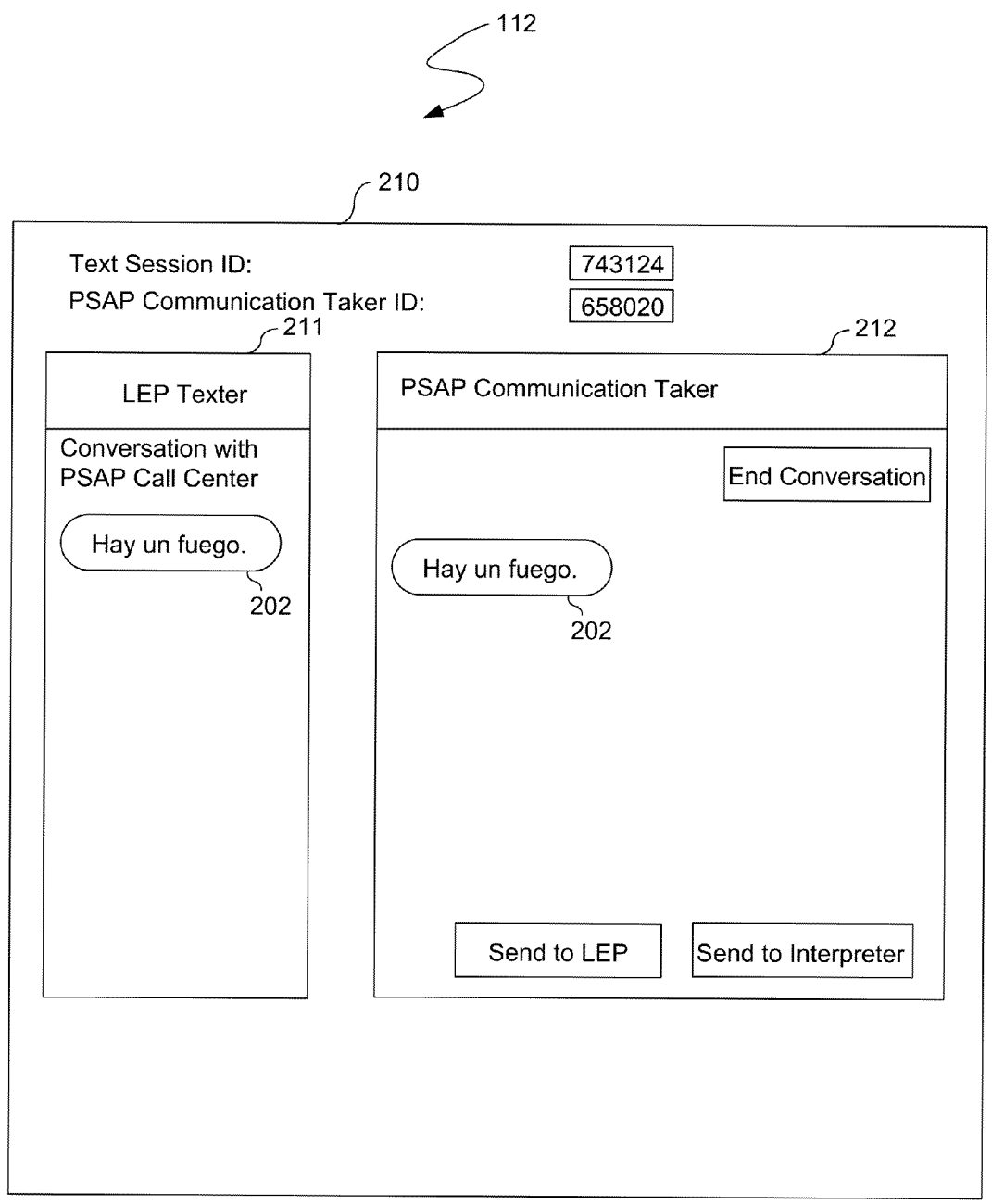
FIG. 2B illustrates a PSAP communication taker computing device GUI that is displayed by the PSAP communication workstation.

FIG. 2B illustrates a PSAP communication taker computing device GUI 210 that is displayed by the PSAP communication workstation 112. The PSAP communication taker computing device GUI 210 may include both an LEP texter window 211 that displays to the PSAP communication taker 110 what the LEP texter 102 is viewing for the conversation and a PSAP communication taker window 212 that displays what information is sent and received from the PSAP communication taker 110 to the language interpreter 120.

For example, the LEP texter window 212 displays the text message 202 that was also displayed by the computing device GUI 200 illustrated in FIG. 2A. After determining that the text message 202 is not English, i.e., either by the PSAP communication taker 110 or through a language identification web service, the PSAP communication taker 110 can send the Spanish text message 202 to the interpreter 120 for language interpretation. In one embodiment, the PSAP communication taker 110 can simply click the text message 202 with a user input so that the text message 202 appears in the PSAP communication taker window 212. In another embodiment, the PSAP communication taker 110 can manually type the text message 202 into the PSAP communication taker window 212. In yet another embodiment, the text message 202 may automatically appear in the PSAP communication taker window 212. Utilizing any such embodiments, the PSAP communication taker 110 can send the text message 202 to the interpreter 120 for language interpretation by providing an input such as selecting a button that sends the text message 202 to the interpreter 120 for language interpretation. Although two windows are displayed in the PSAP communication taker GUI 210, a single window or more than two windows may be utilized to display the text messages of the LEP texter 102.

FIG. 2B also illustrates various identifiers. For instance, a unique text session identifier may be displayed. The text session identifier may be unique for a certain time period. The PSAP communication taker 110 can provide the text session identifier to the interpreter 120 to establish a language interpretation session. Further, the PSAP communication taker 110 may have a unique PSAP communication taker identifier that is displayed in the PSAP communication taker GUI 210.

Figure 2C:
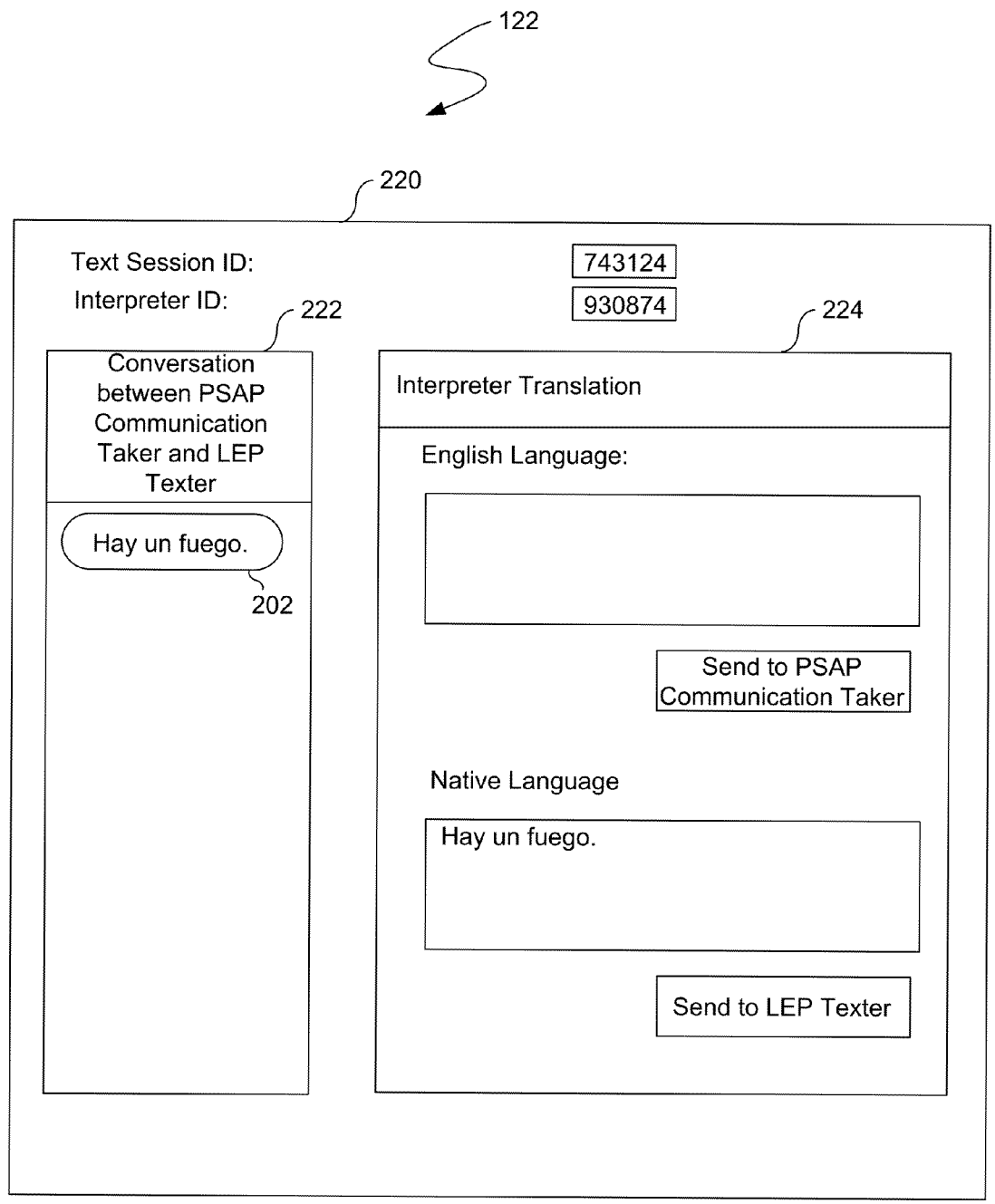
FIG. 2C illustrates an interpreter workstation GUI that is displayed by the interpreter workstation illustrated in FIG. 1A.

FIG. 2C illustrates an interpreter workstation GUI 220 that is displayed by the interpreter workstation 122 illustrated in FIG. 1A. The interpreter workstation GUI 220 displays a conversation window 222 and an interpreter translation window 224. The conversation window 222 displays the messages in both languages that are sent and received between the LEP texter 102 and the PSAP communication taker 110. For instance, the conversation window 222 can display the text message 202 in Spanish prior to any translation. The translation window 224 has a window for the English language text and a window for the native language text. The interpreter 120 can be asked by the PSAP communication taker 110 over the voice communication or through another format, e.g., text, video, image, etc., to translate the message 202 from the native language, e.g., Spanish, to English so that the PSAP communication taker 110 can understand the text message 202. An example of another type of request other than voice for translation of the text message 202 is the PSAP communication taker 110 providing an input as illustrated in FIG. 2B and the text message automatically appearing in the native language window.

FIG. 2C also illustrates various identifiers. The text session identifier may be displayed. The text session identifier allows the multi-channel code 116 to manage the text flow between the PSAP communication taker workstation 112 and the interpreter workstation 122.

Figure 2D:
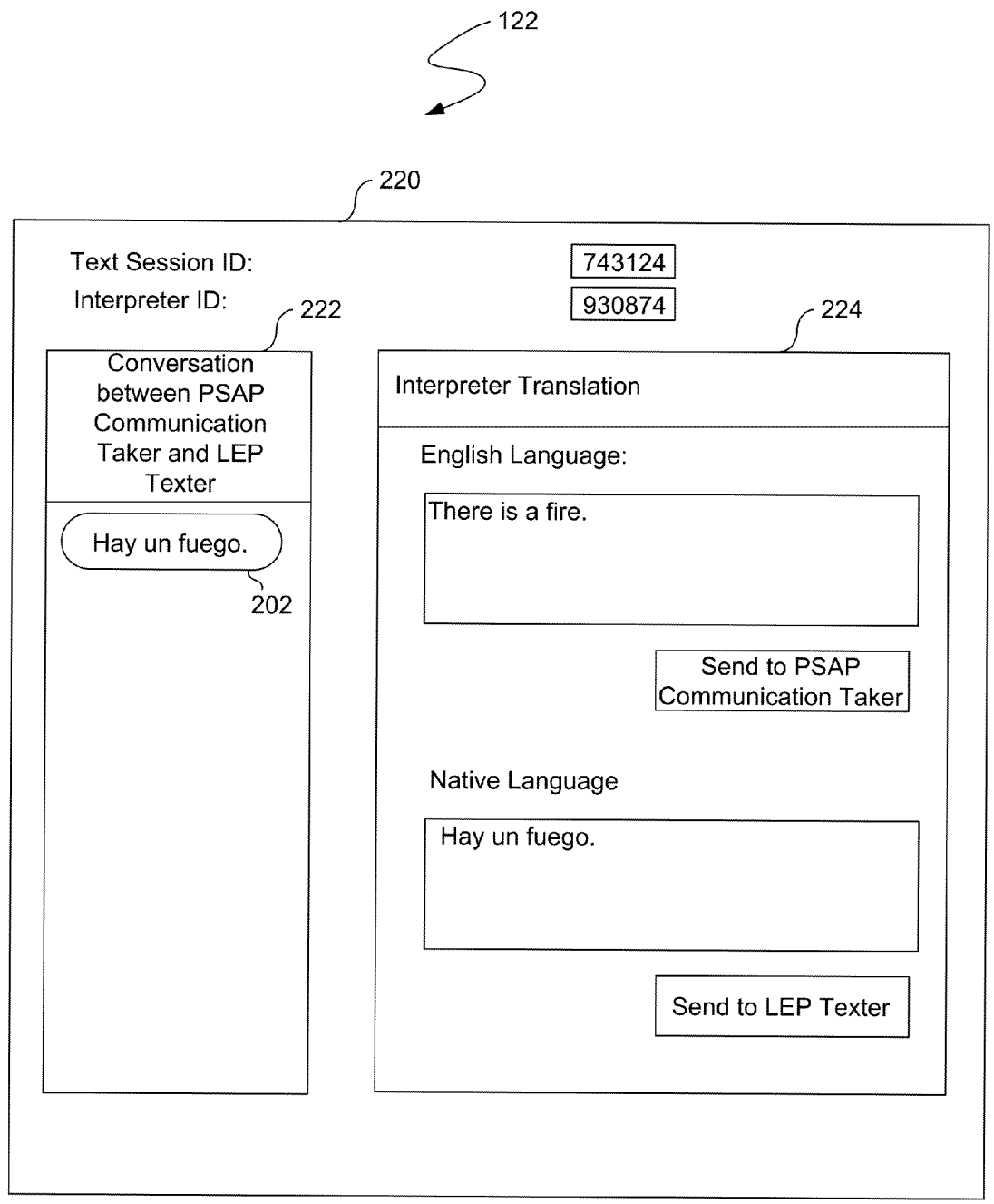
FIG. 2D illustrates the interpreter workstation GUI of FIG. 2C in which the interpreter translates the text message into English.

FIG. 2D illustrates the interpreter workstation GUI 220 of FIG. 2C in which the interpreter translates the text message 202 into English. The English translation appears in the English language window. The interpreter 120 may then send the English translated text message to the PSAP communication taker 110 by selecting a button to perform such action.

Figure 2E:
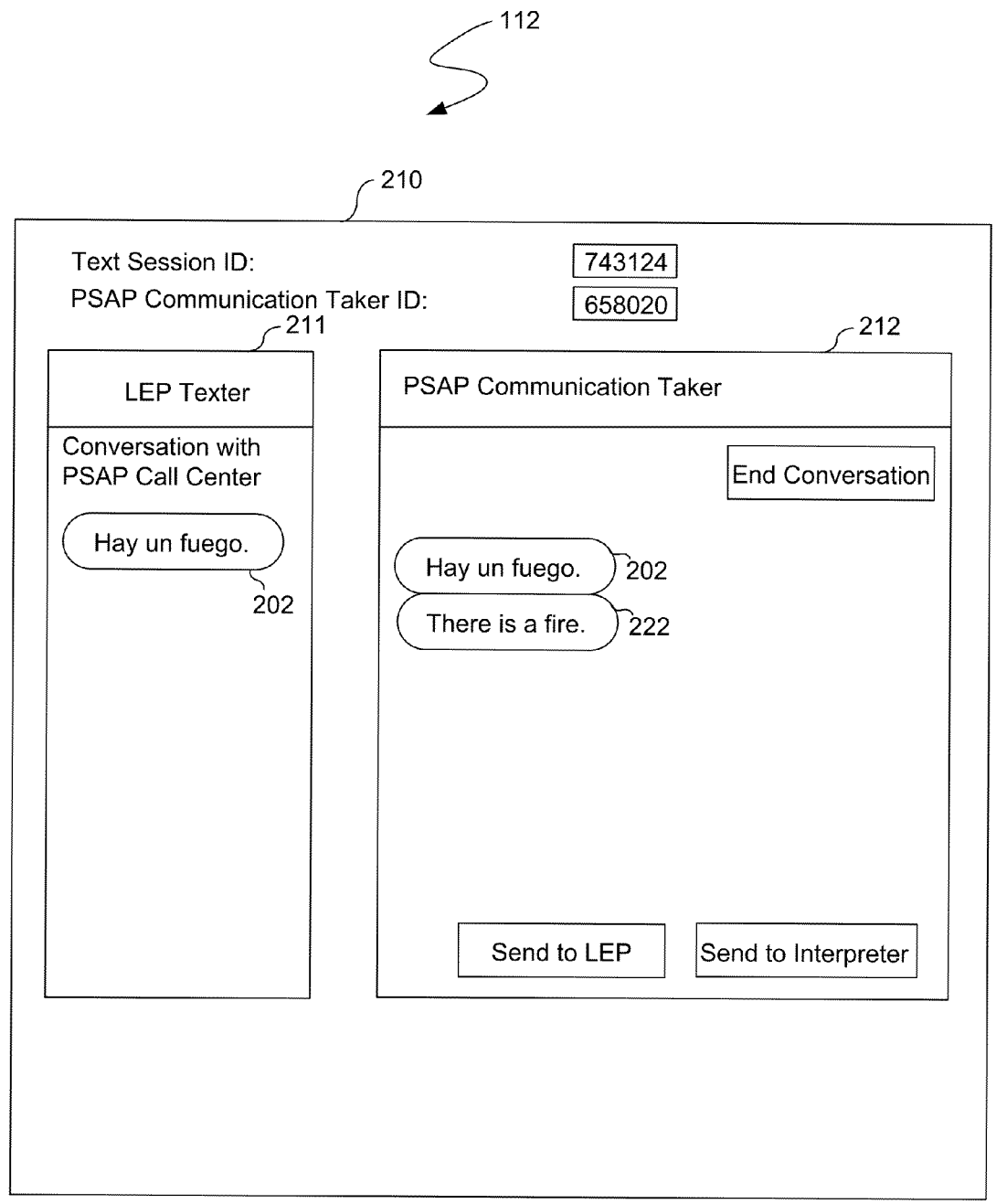
FIG. 2E illustrates the PSAP communication taker computing device GUI of FIG. 2B displaying a received translated text message from the interpreter workstation as illustrated by FIG. 2D.

FIG. 2E illustrates the PSAP communication taker computing device GUI 210 of FIG. 2B displaying a received translated text message 222 from the interpreter workstation 122 as illustrated by FIG. 2D. The received translated text message 222 is only displayed for the PSAP communication taker 110 to understand what the LEP texter was requesting in English. The translated text message 222 is not sent from the PSAP communication taker computing device 112 to the LEP computing device 104 as providing an English text message to the LEP of what the LEP was request in Spanish may lead to lead and complication.

Figure 2F:
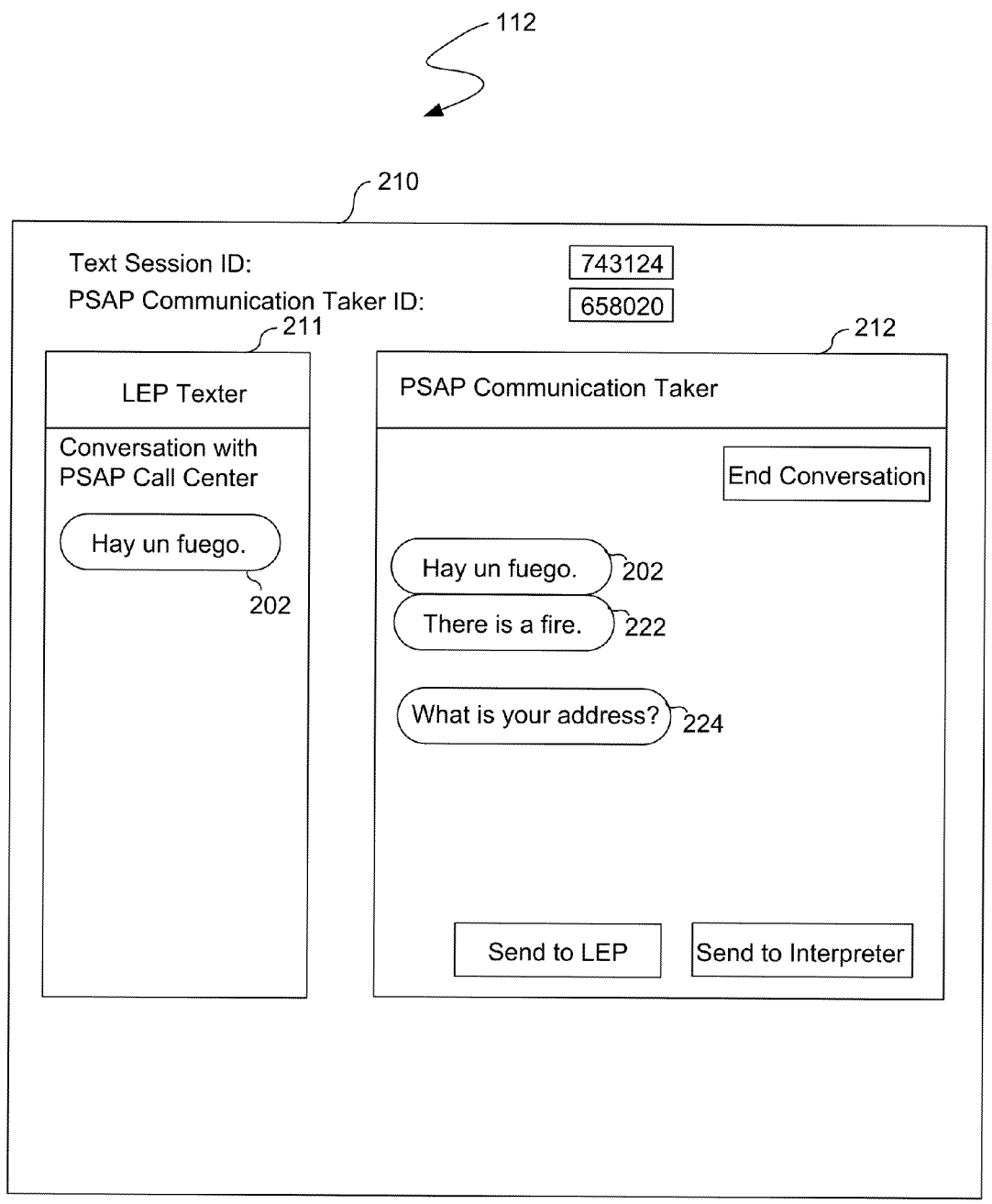
FIG. 2F illustrates the PSAP communication taker computing device GUI of FIG. 2E displaying a response text message to the request of the LEP texter formulated by the PSAP communication taker in English.

FIG. 2F illustrates the PSAP communication taker computing device GUI 210 of FIG. 2E displaying a response text message 224 to the request of the LEP texter 102 formulated by the PSAP communication taker 110 in English. The PSAP communication taker 110 can send the response text message 224 to the interpreter 120 for translation into Spanish as the LEP 102 may not understand the response in English.

Figure 2G:
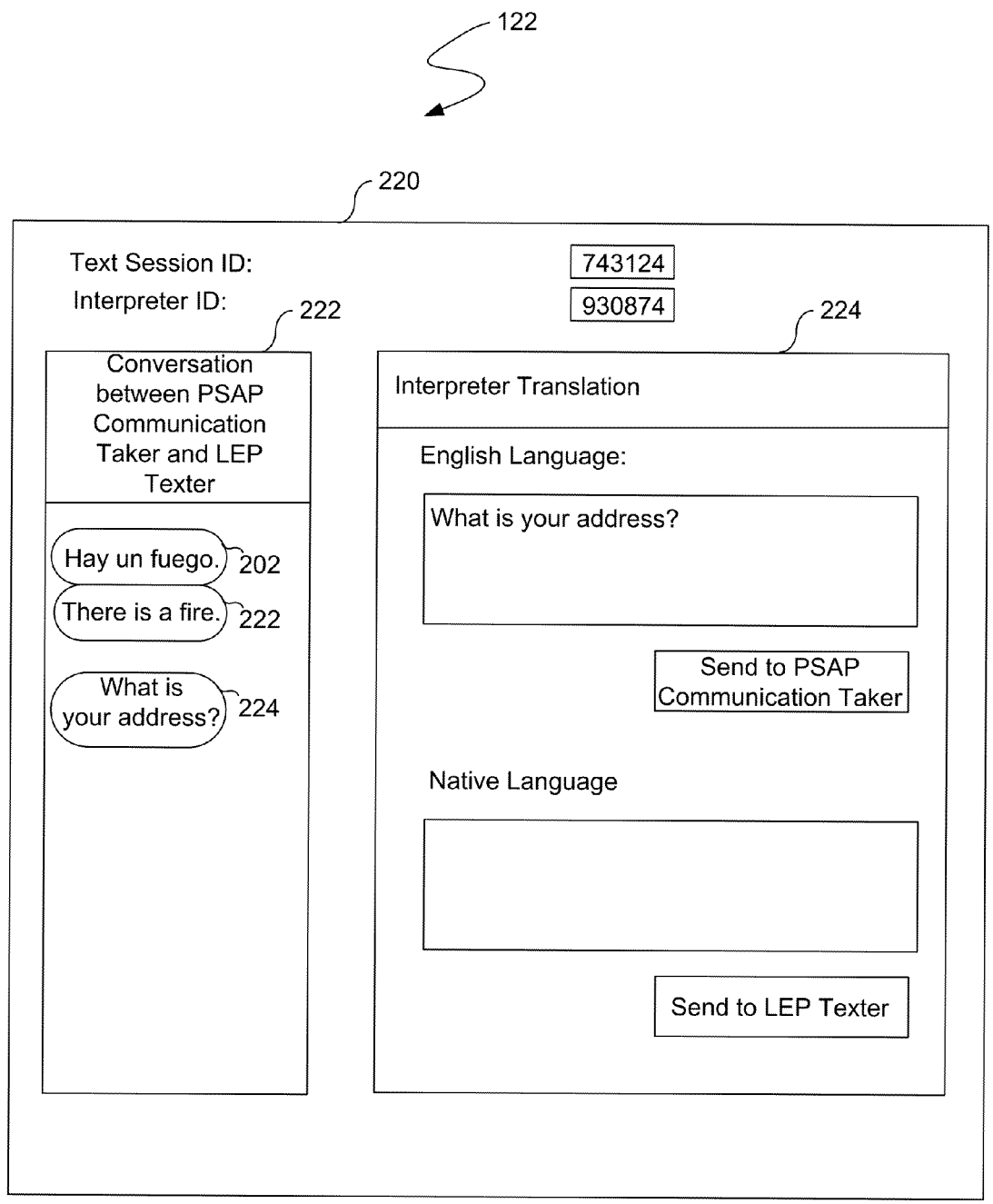
FIG. 2G illustrates the interpreter workstation GUI of FIG. 2C in which the interpreter receives the response text message in English.

FIG. 2G illustrates the interpreter workstation GUI 220 of FIG. 2C in which the interpreter receives the response text message 224 in English. The response text message 224 appears in the English language window.

Figure 2H:
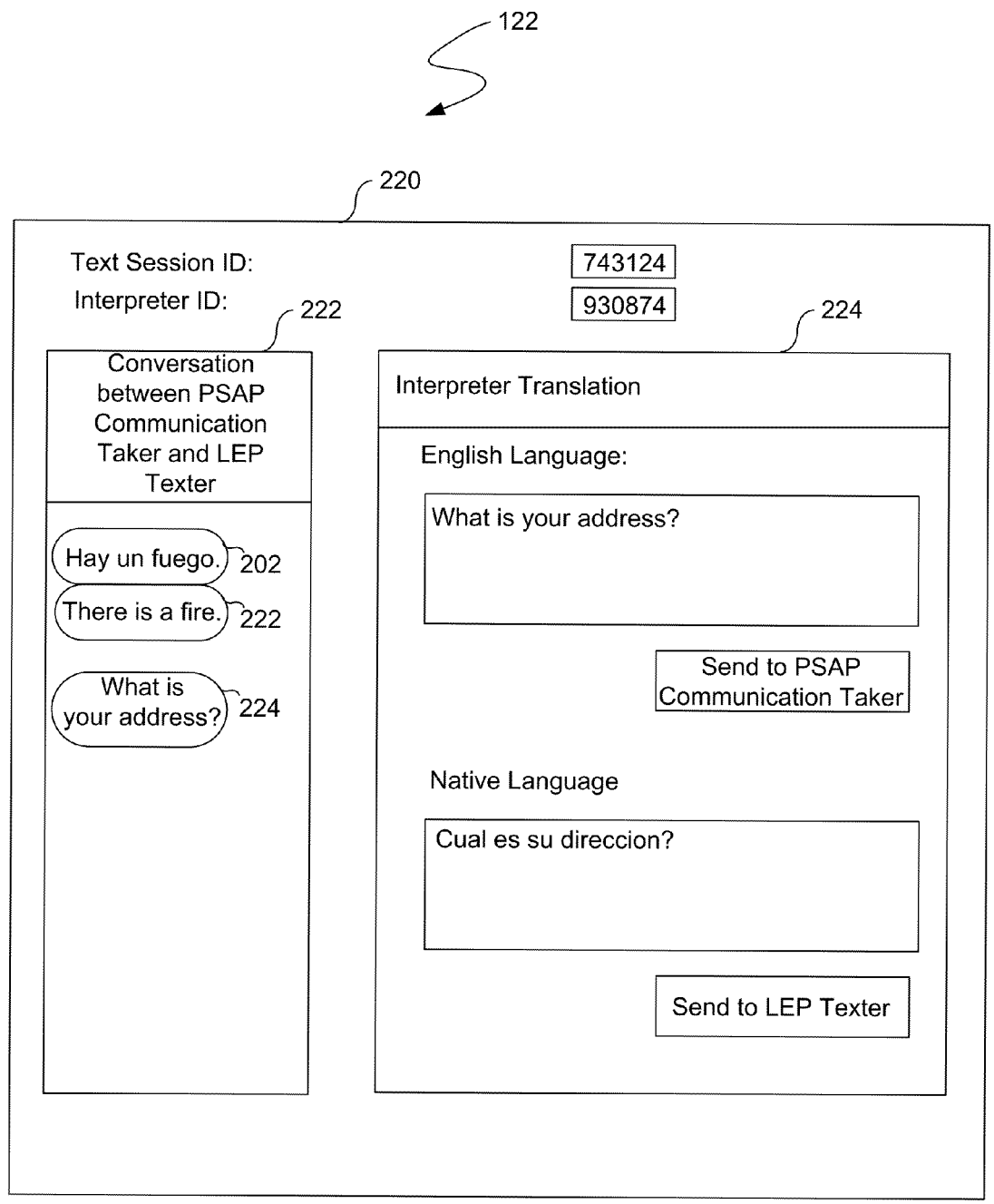
FIG. 2H illustrates the interpreter workstation GUI of FIG. 2G in which the interpreter translates the response text message to Spanish.

FIG. 2H illustrates the interpreter workstation GUI 220 of FIG. 2G in which the interpreter translates the response text message 224 to Spanish. The interpreter 120 may then send the translated response text message to the LEP texter 102 directly if a non-gated configuration is utilized. The translated response text message would appear to the LEP texter as being received from the PSAP communication taker 110. If a gated configuration is utilized, the interpreter 120 sends the translated response text message to the PSAP communication taker 110 for transmission to the LEP texter 102 at the discretion of the PSAP communication taker 110.

Figure 2I:
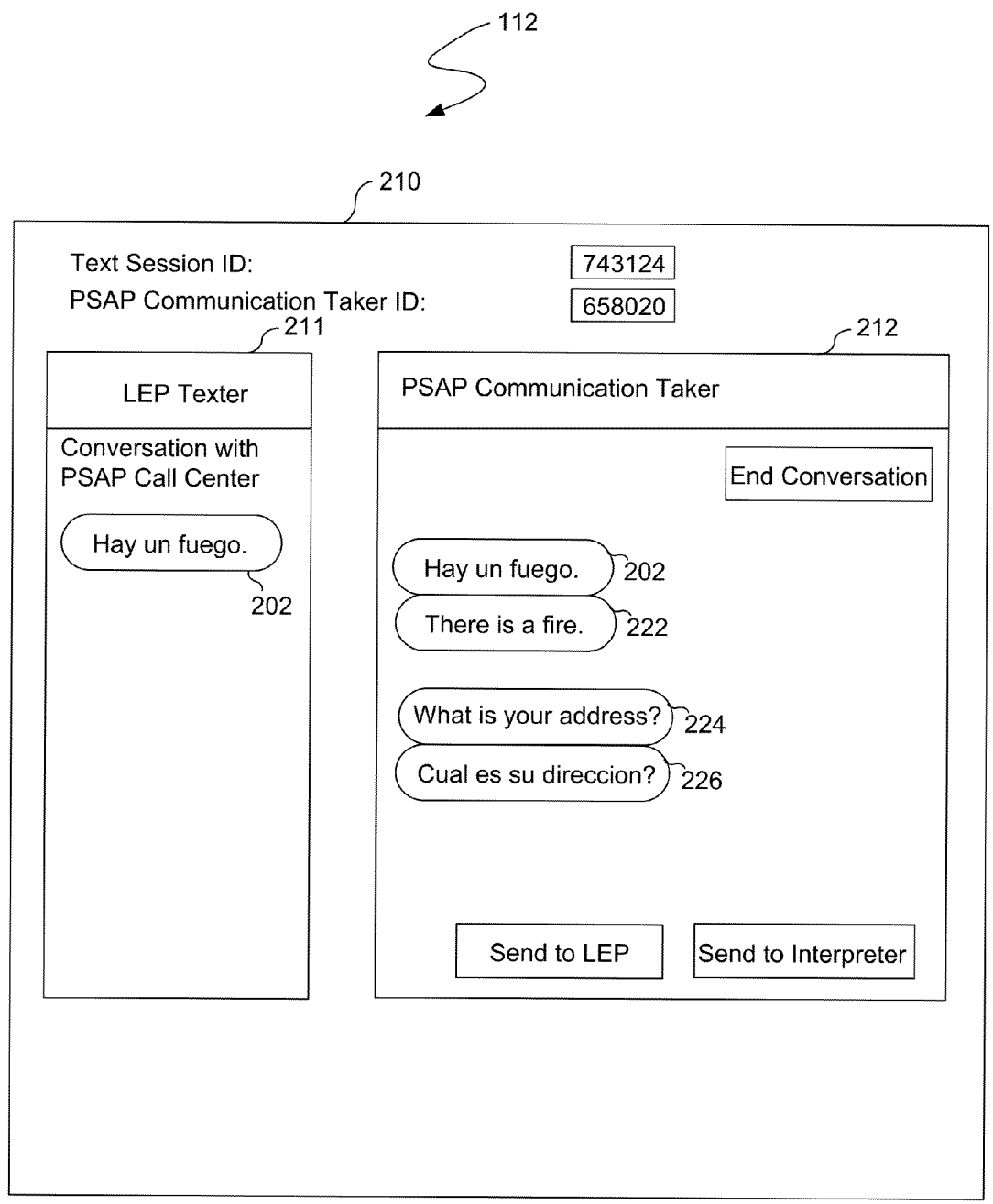
FIG. 2I illustrates a gated configuration of the PSAP communication taker computing device GUI in which the PSAP communication taker receives a translated response text message.

FIG. 2I illustrates a gated configuration of the PSAP communication taker computing device GUI 210 in which the PSAP communication taker 110 receives a translated response text message 226. The translated response text message 226 is displayed in the PSAP communication taker window 212. The PSAP communication taker 120 may then send the translated response test message 226 to the LEP texter 102 at the discretion of the PSAP communication taker 120.

Figure 2J:
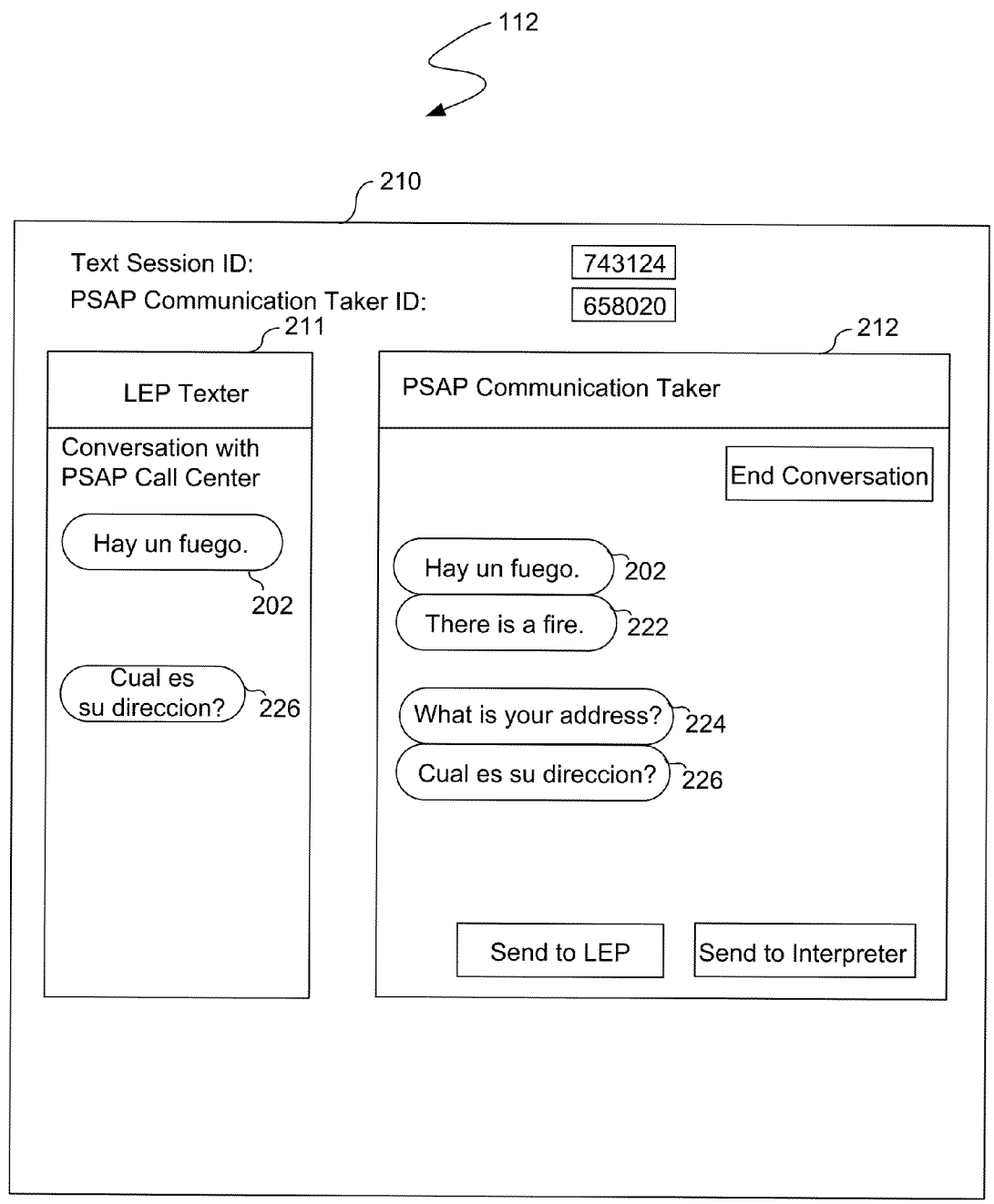
FIG. 2J illustrates the gated configuration of the PSAP communication taker computing device GUI in which the PSAP communication taker sends the translated response text message to the LEP texter.

FIG. 2J illustrates the gated configuration of the PSAP communication taker computing device GUI 210 in which the PSAP communication taker 110 sends the translated response text message 226 to the LEP texter 102. The translated response text message 226 is displayed in the LEP texter window 211 of the PSAP communication taker computing device GUI 210.

Figure 2K:
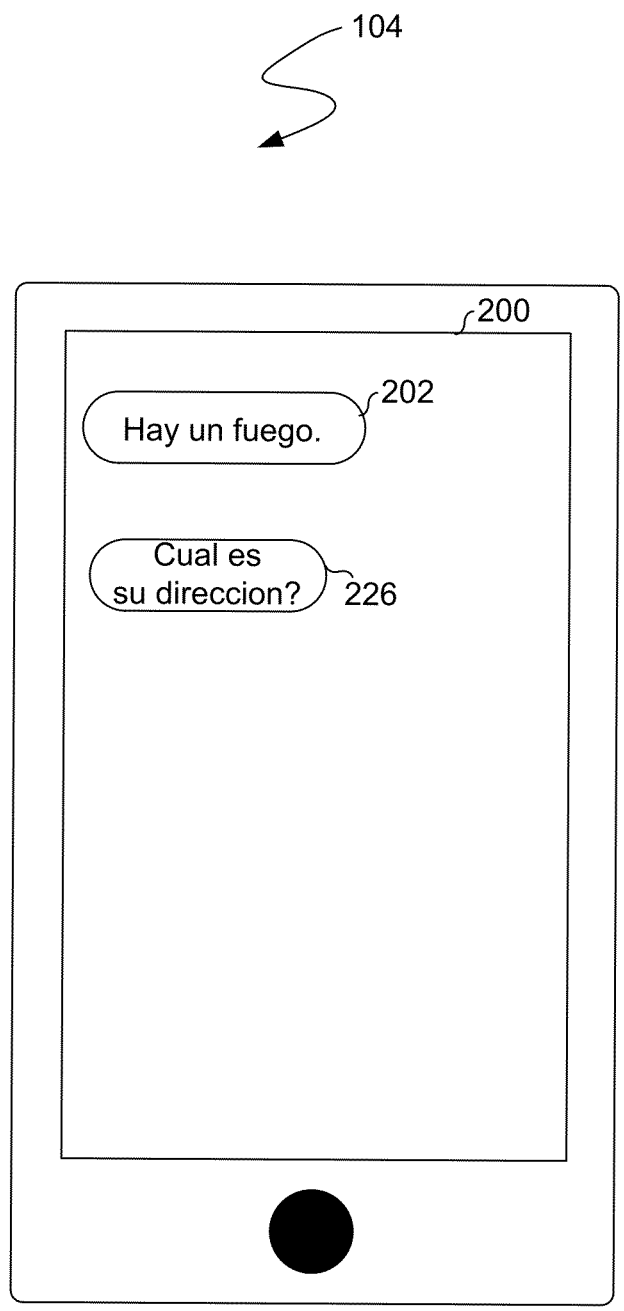
FIG. 2K illustrates the computing device GUI displayed by the computing device with the translated response text message.

FIG. 2K illustrates the computing device GUI 200 displayed by the computing device 104 with the translated response text message 226. If the translated response text message 226 is prepared according to a non-gated configuration, the translated response text message 226 would also appear as illustrated in FIG. 2K.

Figure 3:
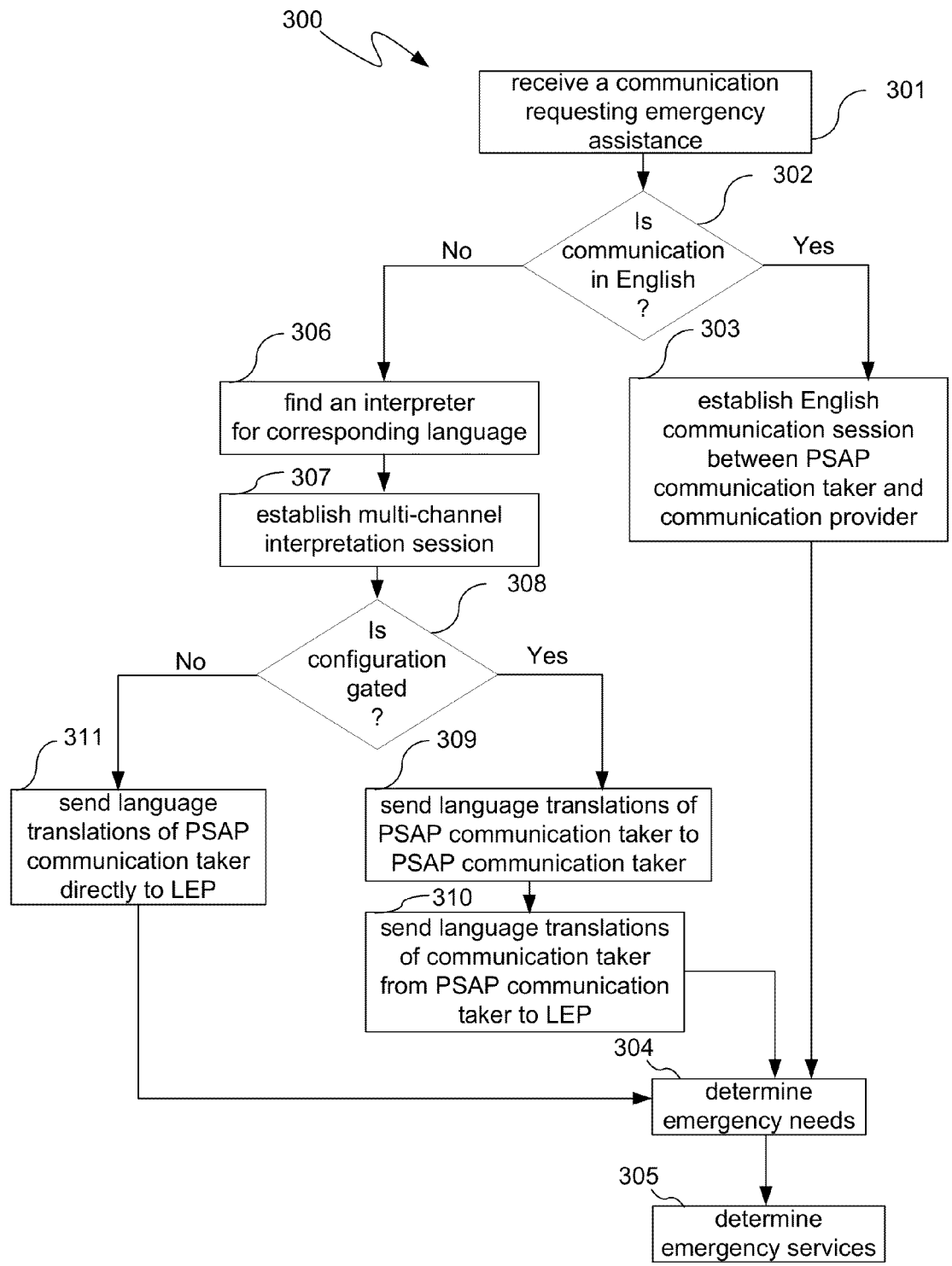
FIG. 3 illustrates a process for determining whether a gated or a non-gated configuration is utilized to send translated response text messages.

FIG. 3 illustrates a process 300 for determining whether a gated or a non-gated configuration is utilized to send translated response text messages. At a process block 301, a communication from an LEP 102 is received requesting emergency assistance. The process 300 proceeds to a decision block 302 to determine if the communication is in English. If the PSAP communication taker 110 determines that the communication is in English, the process 300 proceeds to a process block 303 to establish an English communication session between the PSAP communication taker 110 and the communication provider. The process 300 then proceeds to a process block 304 to determine the emergency needs of the communication provider. After determining the emergency needs of the communication provider, the process 300 proceeds to a process block 305 to determine the emergency services that the PSAP communication taker 110 can request for dispatch to the communication provider.

If the process 300 determines that the communication is not in English at the decision block 302, then the process 300 proceeds to a process block 306 to find an interpreter for the corresponding language. The corresponding language may be determined by a hub to which the PSAP communication taker 110 sends the communication. After receiving a response from the hub with the identified language, the PSAP communication taker 110 may then request language interpretation based upon the identified language, e.g., Spanish, and the language spoken by the PSAP communication taker 110, e.g., English. The process 300 then proceeds to a process block 307 to establish a multi-channel interpretation session. For example, the PSAP communication taker 110 may initiate a first channel communication, e.g., voice, to the interpreter 120 of the identified language, e.g., Spanish. After the connection is established between the two endpoints, e.g., PSAP communication taker 110 and interpreter 120, the native language communication, e.g., a string of text in Spanish, is routed to the interpreter workstation GUI 220. The interpreter 120 performs a translation of the Spanish string of text and sends an English translation of the Spanish string of text to the PSAP communication taker 110 through a second channel communication, e.g., a communication based upon sending and receiving strings of text. The interpreter may additionally or alternatively read the English translation of the Spanish string of text to the PSAP communication taker 110 through the voice channel in English. The PSAP communication taker 110 may then prepare a response to the LEP, e.g., a follow up question. The PSAP communication taker 110 may then verbally provide the response to the interpreter 120 through the first channel so that the interpreter 120 may translate the response into the native language, e.g., Spanish. In another embodiment, the PSAP communication taker 110 may additionally or alternatively provide the response to the interpreter 120 through the second channel. Further, the process 300 proceeds to a decision block 308 to determine if the configuration is gated or non-gated. If the process 300 determines that the configuration is non-gated, the process 300 proceeds to a process block 311 to send language translations of the PSAP communication taker responses, e.g., the response, directly to the LEP 102. In another embodiment, the response is also sent to the PSAP communication taker 110. The process 300 then proceeds to the process block 304 so that the PSAP communication taker 110 may determine the emergency needs of the LEP 102 and then to the process block 305 so that the PSAP communication taker 110 may determine the emergency services.

If the process 300 determines that the configuration is gated at the decision block 308, then the process 300 sends the language translations of the PSAP communication taker 110 to the PSAP communication taker 110. The PSAP communication taker 110 may then review the translated responses at the discretion of the PSAP communication taker 110 prior to sending the translated responses to the LEP 102. In one embodiment, the PSAP communication taker 110 receives the response in both the language of the language spoken by the LEP Texter 102, e.g., Spanish, and the language spoken by the PSAP communication taker 110, e.g., English. The PSAP communication taker 110 may then read the English portion of the message to verify that the PSAP communication taker 110 wants to send the message in Spanish to the LEP Texter 102. The process 300 then sends the language translations of the responses of the PSAP communication taker 110 to the LEP 102 if the PSAP communication taker 110 provides such a verification input. The process 300 then proceeds to the process block 304 so that the PSAP communication taker 110 may determine the emergency needs of the LEP 102 and then to the process block 305 so that the PSAP communication taker 110 may determine the emergency services.

The translation aspects of the process 300 may be iterated until the communication between the PSAP communication taker 110 and the LEP texter 102 is over, e.g., the emergency is over. The PSAP communication taker 110 may then terminate the communication session with the interpreter 120.

Figure 4:
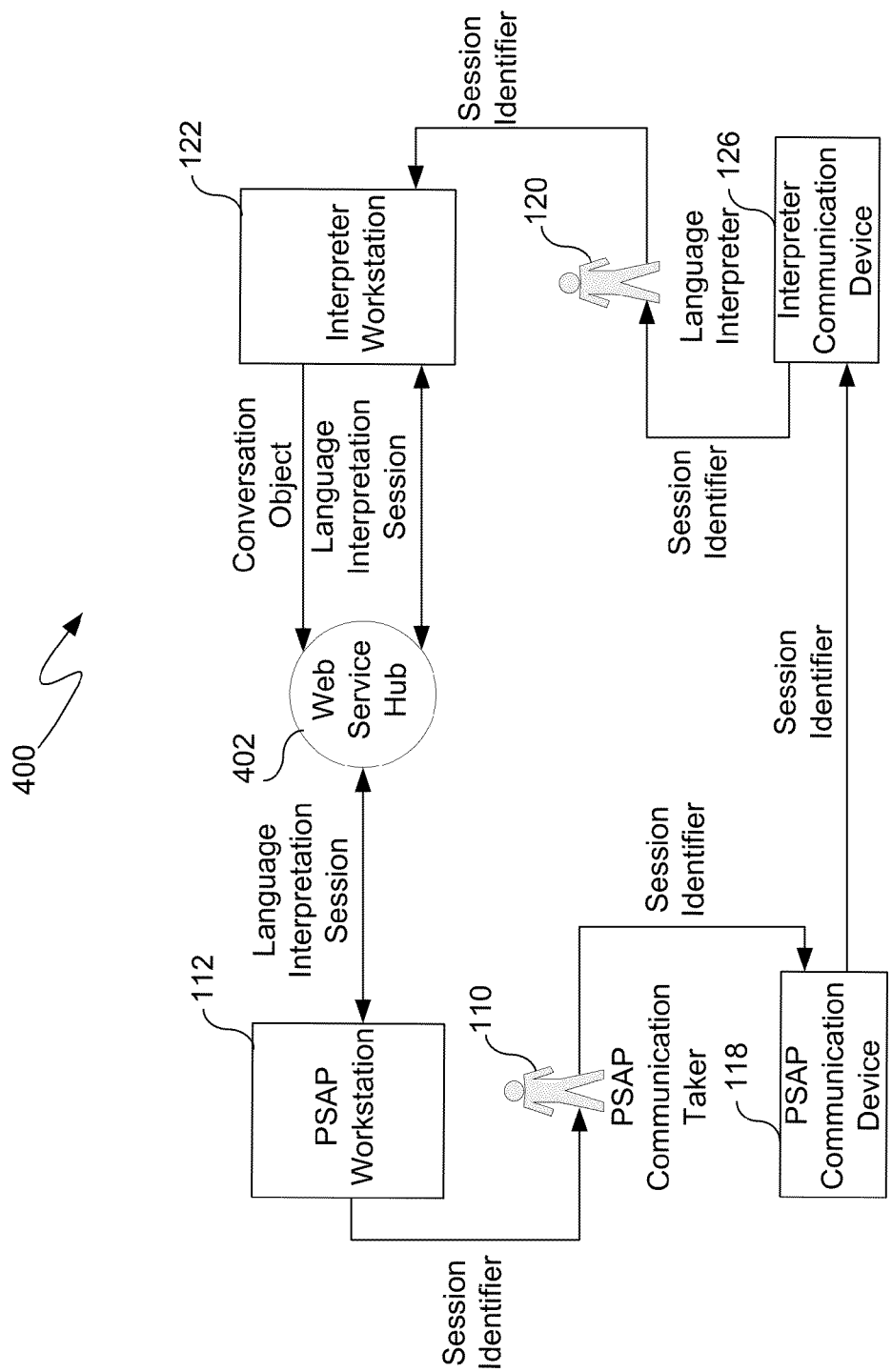
FIG. 4 illustrates a hub configuration that is utilized to provide multi-channel interaction between the PSAP workstation and the interpreter workstation on a real time basis.

FIG. 4 illustrates a hub configuration 400 that is utilized to provide multi-channel interaction between the PSAP workstation 112 and the interpreter workstation 122 on a real time basis. The hub configuration 400 includes a web service hub 402. The PSAP workstation 112 generates a session identifier. The PSAP communication taker 110 then provides that session identifier to the language interpreter, e.g., via an IVR, language interpreter system, etc., through the interpreter communication device 126. The language interpreter 120 then inputs the session identifier into the interpreter workstation 122. Alternatively, the session identifier is inputted automatically without the interpreter 120 providing such input. The interpreter workstation 122 then sends a conversation object to the web service hub by instantiating an API function of the web service. The session identifier may be passed to the function as an argument. The conversation object may be include text of the conversation in addition to metadata such as the various identifiers, e.g., session identifier, PSAP communication taker identifier, interpreter identifier, etc., and additional information associated with the conversation. The web service hub 402 then coordinates the flow of the language interpretation session. For instance, the web service hub 402 synchronizes the ordering of the strings of text so that strings of text are matched with corresponding translated strings of text. The web service hub 402 may also be utilized to perform language identification for a PSAP communication taker 110 prior to the PSAP communication taker establishing a communication session with the interpreter 120 of FIG. 3. The web service hub 402 may perform the language identification in real-time.

The web service hub 402 is platform independent. As an example, the web service hub 402 utilizes industry standard SOAP compliant XML. Therefore, the web service hub 402 may be utilized to establish language interpretation sessions between different types of computing systems.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a personal computer, laptop computer, set top box, cell phone, smartphone, tablet device, portable media player, video player, or the like.

Figure 5:
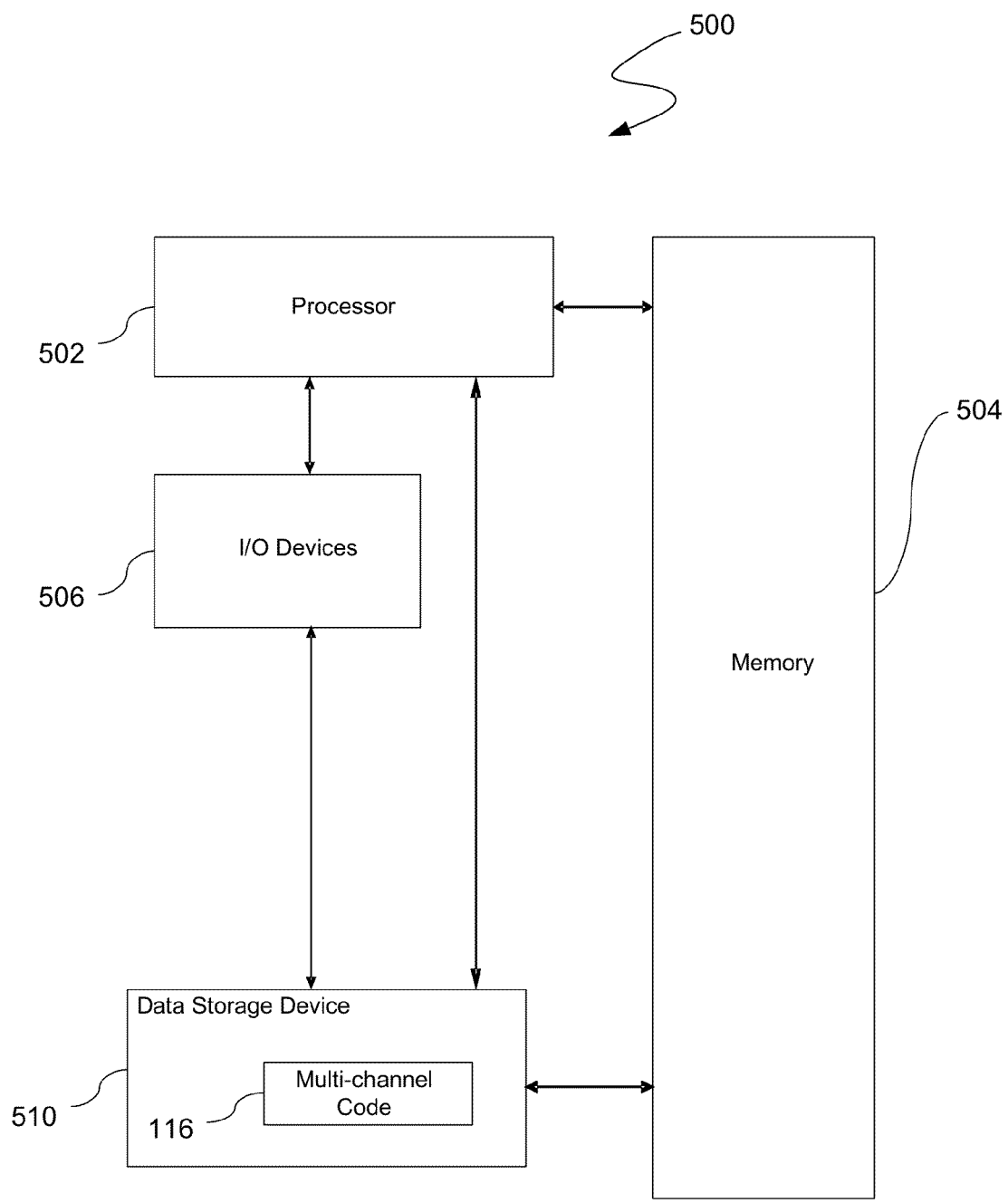
FIG. 5 illustrates a block diagram of a system that provides multi-channel language interpretation.

FIG. 5 illustrates a block diagram of a system 500 that provides multi-channel language interpretation. In one embodiment, the system 500 is implemented utilizing a general purpose computer or any other hardware equivalents. Thus, the system 500 comprises a processor 502, a memory 504, e.g., random access memory ("RAM") and/or read only memory (ROM), various input/output devices 506, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)), a data storage device 508, and the multi-channel code stored on the data storage device 508.

The multi-channel code 116 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 502 in the memory 504 of the computer. As such, the multi-channel code 116 (including associated data structures) of the present disclosure may be stored on a computer readable medium, e.g., RAM memory, magnetic or optical drive or diskette and the like. The system 500 may be utilized for a hardware implementation of any of the configurations provided herein.

It is understood that the computer program products, apparatuses, systems, and processes described herein may also be applied in other types of apparatuses, systems, and processes. Those skilled in the art will appreciate that the various adaptations and modifications of the embodiments of the apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

We claim:

1. A system comprising:
an interpreter workstation that receives a communication, from a PSAP workstation, via a first channel, establishes a real-time language translation session of the communication to translate the communication from a first language to a second language via the first channel, and sends a translated communication to the PSAP workstation via the first channel, the PSAP workstation receiving the communication from a user device in the first language to request a service provided by a PSAP associated with the PSAP workstation, the PSAP workstation sending the translated communication to the user device; and an interpreter communication device that receives data, from a PSAP communication device, via a second channel during performance of the real-time language translation of the communication to assist a language interpreter in performing the real-time language translation of the communication, the second channel having a distinct modality from the first channel.

2. The system of claim 1, wherein the first channel is text-based, and the second channel is voice-based.

3. The system of claim 1, wherein the first channel is image-based, and the second channel is voice-based.

4. The system of claim 1, wherein the first channel is video-based, and the second channel is voice-based.

5. The system of claim 1, wherein the interpreter communication device receives a unique session identifier via the first channel that is utilized to establish the language interpretation session via the second channel.

6. The system of claim 1, wherein a PSAP communication taker determines if the real-time language translation is sent to the user device based upon a gated configuration.

7. The system of claim 1, wherein the real-time language translation is provided directly to the user device based upon a non-gated configuration.

8. A computer program product comprising a non-transitory computer readable medium having a computer readable program stored thereon, wherein the computer readable program when executed on a computer causes the computer to:

receive a communication, at an interpreter workstation from a PSAP workstation, via a first channel, the PSAP workstation receiving the communication from a user device in the first language to request a service provided by a PSAP associated with the PSAP workstation;

establish, at the interpreter workstation, a real-time language translation session of the communication to translate the communication from a first language to a second language via the first channel;

send, from the interpreter workstation, a translated communication to the PSAP workstation via the first channel; and receive data, at an interpreter communication device from a PSAP communication device, via a second channel during performance of the real-time language translation of the communication to assist a language interpreter in performing the real-time language translation of the communication, the second channel having a distinct modality from the first channel.

9. The computer program product of claim 8, wherein the first channel is text-based, and the second channel is voice-based.

10. The computer program product of claim 8, wherein the first channel is image-based, and the second channel is voice-based.

11. The computer program product of claim 8, wherein the first channel is video-based, and the second channel is voice-based.

12. The computer program product of claim 8, wherein the interpreter communication device receives a unique session identifier via the first channel that is utilized to establish the language interpretation session via the second channel.

13. The computer program product of claim 8, wherein a PSAP communication taker determines if the real-time language translation is sent to the user device based upon a gated configuration.

14. The computer program product of claim 8, wherein the real-time language translation is provided directly to the user device based upon a non-gated configuration.

15. A method comprising:

receiving a communication, at an interpreter workstation from a PSAP workstation, via a first channel, the PSAP workstation receiving the communication from a user device in the first language to request a service provided by a PSAP associated with the PSAP workstation;

establishing, at the interpreter workstation, a real-time language translation session of the communication to translate the communication from a first language to a second language via the first channel;

sending, from the interpreter workstation, a translated communication to the PSAP workstation via the first channel; and receiving data, at an interpreter communication device from a PSAP communication device, via a second channel during performance of the real-time language translation of the communication to assist a language interpreter in performing the real-time language translation of the communication, the second channel having a distinct modality from the first channel.

16. The method of claim 15, wherein the first channel is text-based, and the second channel is voice-based.

17. The method of claim 15, wherein the first channel is image-based, and the second channel is voice-based.

18. The method of claim 15, wherein the first channel is video-based, and the second channel is voice-based.

19. The method of claim 15, wherein a PSAP communication taker determines if the real-time language translation is sent to the user device based upon a gated configuration.

20. The method of claim 15, wherein the real-time language translation is provided directly to the user device based upon a non-gated configuration.

* * * * *